United States Patent
Duong

(10) Patent No.: US 8,360,657 B2
(45) Date of Patent: Jan. 29, 2013

(54) HYDRODYNAMIC TAPERED ROLLER BEARINGS AND GAS TURBINE ENGINE SYSTEMS INVOLVING SUCH BEARINGS

(75) Inventor: Loc Duong, San Diego, CA (US)

(73) Assignee: United Technologies Corporation, Hartford, CT (US)

(*) Notice: Subject to any disclaimer, the term of this patent is extended or adjusted under 35 U.S.C. 154(b) by 0 days.

(21) Appl. No.: 13/462,885

(22) Filed: May 3, 2012

(65) Prior Publication Data

US 2012/0213463 A1    Aug. 23, 2012

Related U.S. Application Data

(62) Division of application No. 12/036,581, filed on Feb. 25, 2011, now Pat. No. 8,235,599.

(51) Int. Cl.
*F16C 33/46* (2006.01)

(52) U.S. Cl. ........................................ 384/572

(58) Field of Classification Search .............. 384/474, 384/475, 571, 572, 575, 576
See application file for complete search history.

(56) References Cited

U.S. PATENT DOCUMENTS

| | | |
|---|---|---|
| 1,941,460 A | 1/1934 | Boden |
| 4,283,096 A | 8/1981 | Picard et al. |
| 4,453,783 A | 6/1984 | Davis et al. |
| 4,683,714 A | 8/1987 | Thebert |
| 4,714,358 A | 12/1987 | Bayer |
| 4,770,548 A | 9/1988 | Otto |
| 4,812,058 A | 3/1989 | Hofmann et al. |
| 4,874,260 A | 10/1989 | Podhajecki |
| 4,915,510 A | 4/1990 | Arvidsson |
| 5,286,114 A | 2/1994 | Raphael |
| 5,894,868 A | 4/1999 | Wuester, Sr. |
| 6,361,217 B1 | 3/2002 | Beasley |
| 6,464,401 B1 | 10/2002 | Allard |
| 6,632,077 B2 | 10/2003 | Sishtia |
| 7,097,413 B2 | 8/2006 | VanDuyn |
| 2003/0142893 A1 | 7/2003 | Joki |

FOREIGN PATENT DOCUMENTS

| | | |
|---|---|---|
| DE | 102009042941 | 3/2011 |
| JP | 7004429 | 1/1995 |
| JP | 200947192 | 5/2009 |

OTHER PUBLICATIONS

EP Search Report dated Jun. 25, 2012 for EP No. 09250501.5.

*Primary Examiner* — Phillip A Johnson

(74) *Attorney, Agent, or Firm* — Carlson, Gaskey & Olds PC

(57) ABSTRACT

Tapered roller bearings and gas turbine engine systems involving such bearings are provided. In this regard, a representative bearing cage for a gas turbine engine includes: an outer cage rim and an inner cage rim; the outer cage rim having a rounded edge at a location of contact between the outer cage rim and a roller.

7 Claims, 4 Drawing Sheets

HYDRODYNAMIC TAPERED ROLLER BEARINGS AND GAS TURBINE ENGINE SYSTEMS INVOLVING SUCH BEARINGS

REFERENCE TO RELATED APPLICATION

This application is a divisional application of U.S. Ser. No. 12/036,581, which was filed on Feb. 25, 2011 now U.S. Pat. No. 8,235,599.

BACKGROUND

1. Technical Field

The disclosure generally relates to bearings.

2. Description of the Related Art

Various mechanical systems, such as gas turbine engines, utilize roller bearings. By way of example, roller bearings are utilized in a gas turbine engine to support a turbine shaft.

Notably, wear of a roller against a bearing inner race face can be a significant issue. By way of example, resultant forces from the bearing radial load with thrust and centrifugal loads press the roller against the bearing inner race flange resulting in friction and wear. The relative rotational motion between rollers and a bearing inner race end flange also results in contact sliding that tends to degrade bearing performance.

SUMMARY

Tapered roller bearings and gas turbine engine systems involving such bearings are provided. In this regard, an exemplary embodiment of a bearing cage for a tapered roller bearing having rollers comprises: an outer cage rim and an inner cage rim; the outer cage rim having a rounded edge at a location of contact between the outer cage rim and a roller. An exemplary embodiment of a bearing assembly comprises: a plurality of rollers, each of the rollers having an end; and a bearing cage operative to contain the plurality of rollers, the bearing cage having an outer cage rim, the outer cage rim having a rounded edge at a location of contact between the outer cage rim and first end of a first of the rollers.

An exemplary embodiment of a gas turbine engine comprises a compressor; a shaft interconnected with the compressor; a turbine operative to drive the shaft; and a bearing assembly operative to support to the shaft, the bearing assembly having a plurality of rollers, a race and a bearing cage operative to contain the plurality of rollers, the bearing cage having a cage rim, the cage rim of the bearing cage being operative to direct load imparted via the rollers to the race.

Other systems, methods, features and/or advantages of this disclosure will be or may become apparent to one with skill in the art upon examination of the following drawings and detailed description. It is intended that all such additional systems, methods, features and/or advantages be included within this description and be within the scope of the present disclosure.

BRIEF DESCRIPTION OF THE DRAWINGS

Many aspects of the disclosure can be better understood with reference to the following drawings. The components in the drawings are not necessarily to scale. Moreover, in the drawings, like reference numerals designate corresponding parts throughout the several views.

DETAILED DESCRIPTION

Tapered roller bearings and gas turbine engine systems involving such bearings are provided, several exemplary embodiments of which will be described in detail. In this regard, some embodiments involve the use of a bearing cage that limits contact of the cage to locations on the roller ends that exhibit reduce motion relative to the cage. As such, friction between the cage and the rollers can be reduced. Notably, various applications of the bearings can involve gas turbine engine systems.

Figure 1:
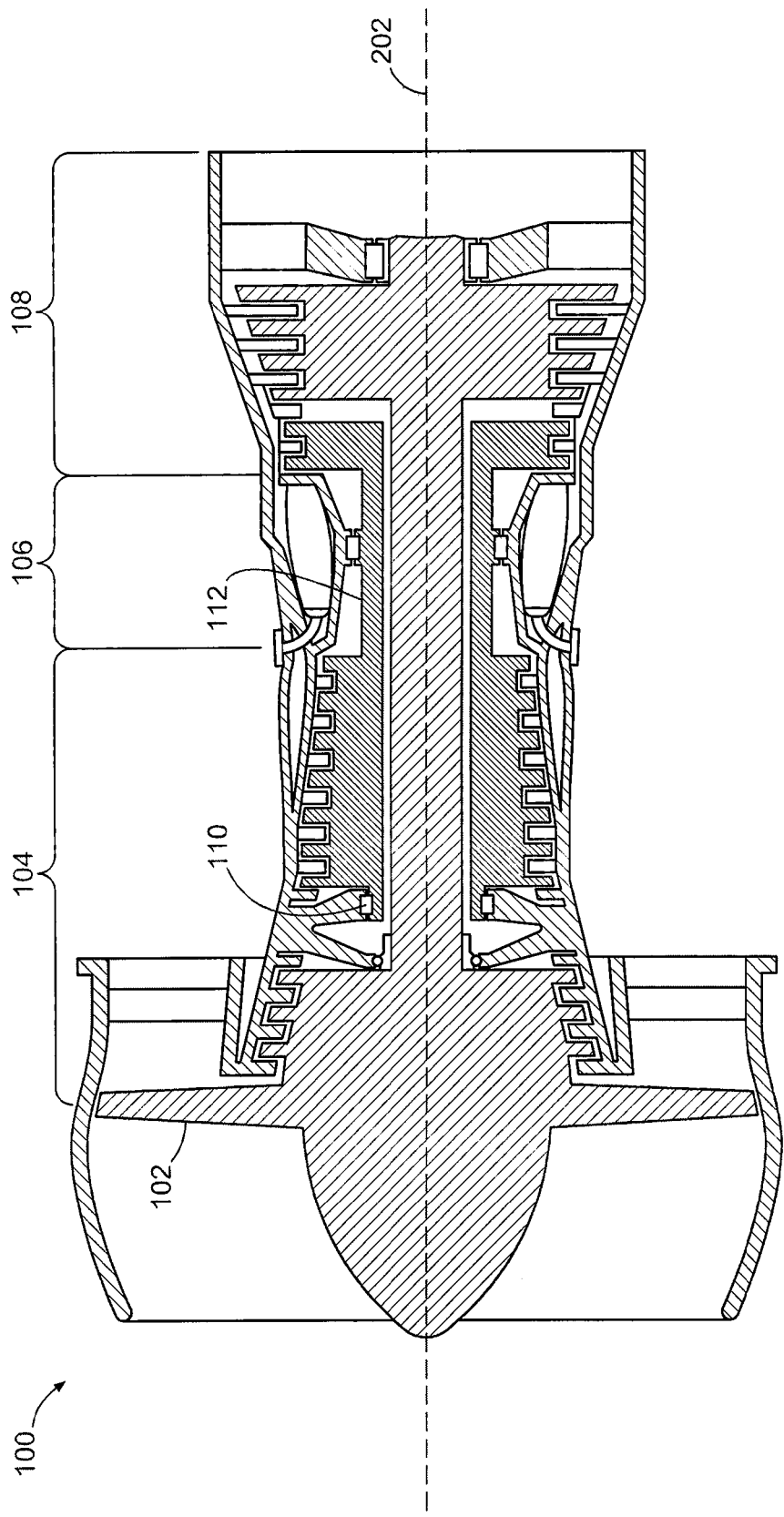
FIG. 1 is a schematic diagram depicting an exemplary embodiment of a gas turbine engine.

Reference is now made to the schematic diagram of FIG. 1, which depicts an exemplary embodiment of a gas turbine engine utilizing an embodiment of a hydrodynamic tapered roller bearing. As shown in FIG. 1, engine 100 is depicted as a turbofan gas turbine engine that incorporates a fan 102, a compressor section 104, a combustion section 106 and a turbine section 108. Although depicted as a turbofan gas turbine engine, it should be understood that the concepts described herein are not limited to use with turbofans or other types of gas turbine engines as the teachings may be applied to other types of engines or other mechanical systems that incorporate tapered roller bearings.

In FIG. 1, tapered roller bearing 110 is utilized in gas turbine engine 100 to support turbine shaft 112. Notably, tapered roller bearings, such as bearing 110, can be utilized in gas turbine engine 100 to carry both radial and axial loads simultaneously.

As is known, there is an ongoing challenge to maintain the integrity of a tapered roller bearing. In this regard, reference is made to the schematic diagram of FIG. 2, which depicts an exemplary embodiment of a tapered roller bearing assembly 200. Bearing assembly 200 incorporates multiple rollers (e.g., a roller 250) that are held by a bearing cage 238, which includes an outer cage rim 240 and an inner cage rim 242. The rollers run about a longitudinal axis 202 between the outer raceway 212 of an outer race 210 and the inner raceway 222 of an inner race 220. The inner race 210 also includes an inner race flange 230 that defines an axially disposed annular surface 231 and a radially disposed annular surface 233.

In known tapered roller bearings, wear of a roller 250 against a bearing inner raceway 222 can be a significant issue. By way of example, in and around a location generally corresponding to area 260 in a known tapered roller bearing, resultant forces from the bearing radial load in combination with thrust and centrifugal loads tend to press the rollers against the inner race flange, thereby creating friction and resulting in wear. The relative rotational motion between the rollers and inner race flange also results in contact sliding. Bearing assembly 200, however, is configured to reduce or eliminate this wear and contact sliding.

Bearing assembly 200 includes a bearing cage configured to reduce this wear and/or contact sliding by using outer cage rim 240 to transfer load from the vicinity of area 260 to the inner race flange 230. Additionally or alternatively, wear and/or sliding contact can be reduced by outer cage rim 240 contacting each roller at a location of reduced relative motion. That is, contact between the outer cage rim and the roller is provided at an outer axial end of longitudinal axis of each roller (e.g., at location 255 of axis 252 of roller 250), the theoretical point of zero relative velocity between outer cage rim and roller. In this embodiment, the outer cage rim 240 incorporates a rounded edge 254 at a point of contact between the outer cage rim 240 and roller end 250 to reduce the degree of contact between the roller end 250 and the outer cage rim 240.

The outer cage rim 240 is shaped to direct the axial load path through the bearing cage rims 240, 242. By way of example, the outer cage rim 240 is generally L-shaped (in cross sectional view), incorporating an axially disposed annular surface 241 and a radially disposed annular surface 243. Such a configuration provides alignment with inner race flange 230 along, for example, line 236 both axially and radially.

Figure 2:
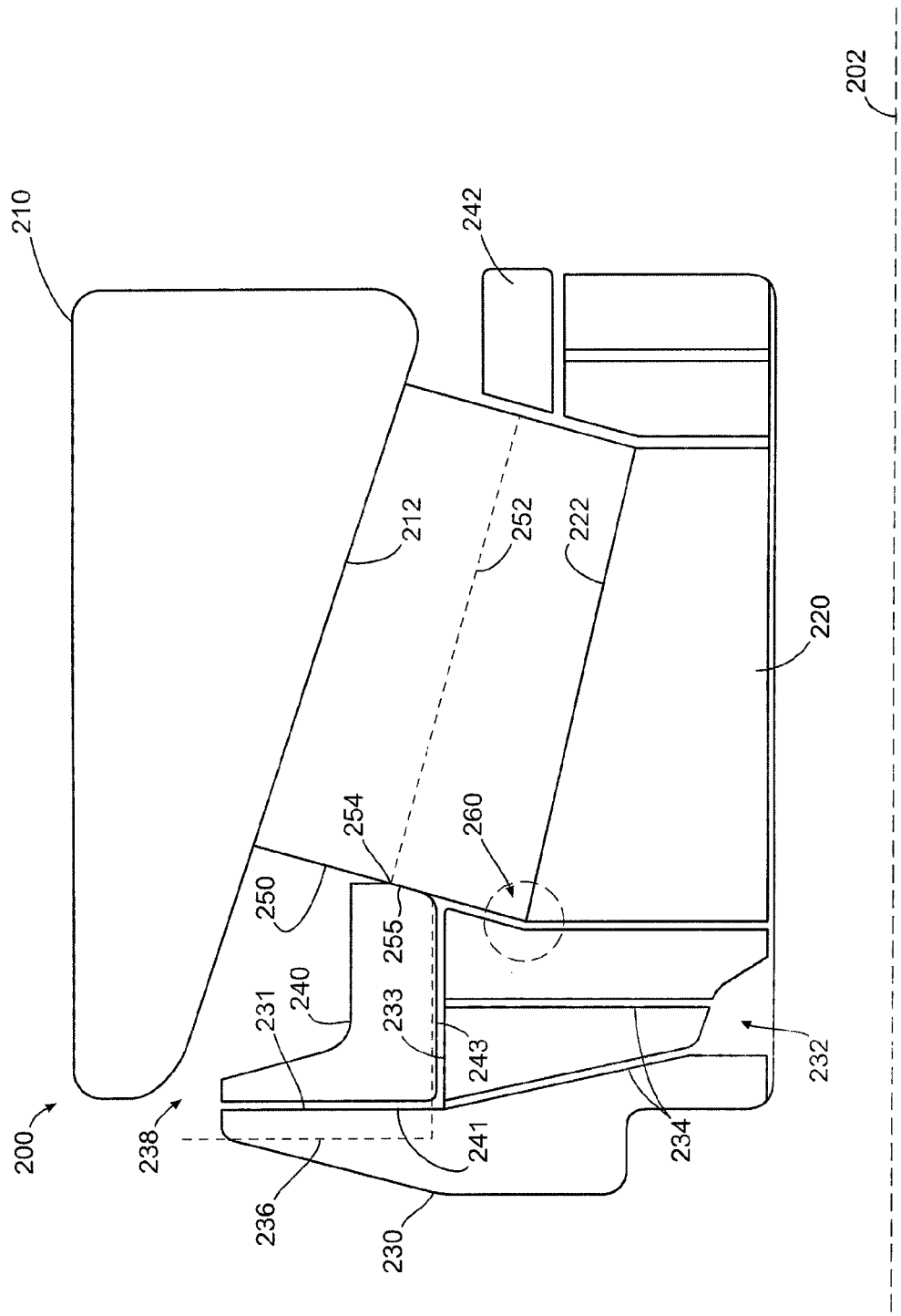
FIG. 2 is a schematic diagram depicting an exemplary embodiment of a hydrodynamic tapered bearing assembly.

In the embodiment of FIG. 2, bearing assembly 200 is lubricated by oil. This embodiment also incorporates optional hydrodynamic features. In this regard, inner race flange 230 includes a recess area 232 to provide lubrication oil to various surfaces of bearing assembly 200. Notably, inner race flange 230 includes a plurality of channels 234 for distribution of oil sourced from the recess area 232. By way of example, the oil lubricates the point of contact 254 between the edge of outer cage rim 240 and roller 250. At point of contact 254, there exists a low resultant relative difference in contact speed between the outer cage rim 240 and the roller 250, creating a theoretical point of zero relative velocity. This tends to reduce friction and wear between the rollers and inner race flange 230 as compared with conventional configurations in which those surfaces are in direct contact with each other (location 260).

Figure 3:
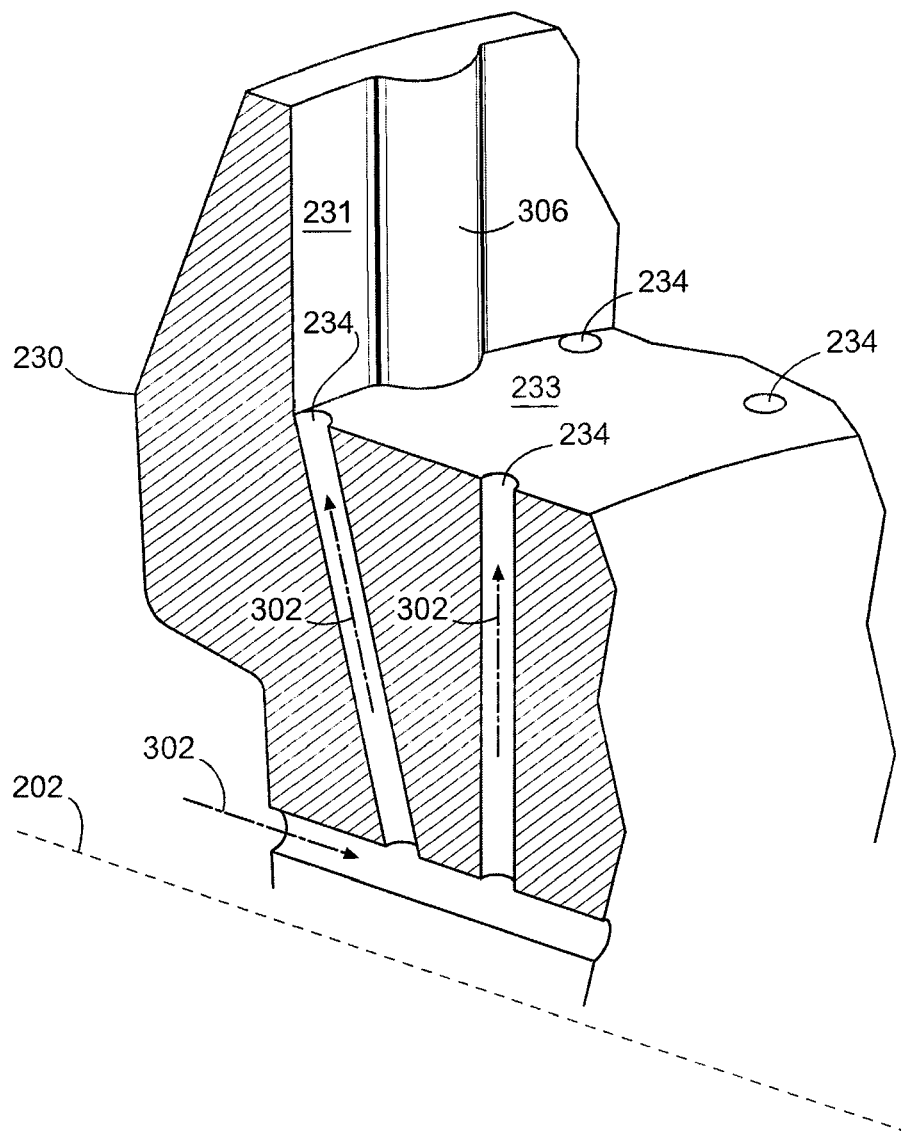
FIG. 3 is a perspective diagram depicting a portion of the hydrodynamic tapered bearing assembly of FIG. 2.

In this regard, reference is made to the schematic diagram of FIG. 3, which depicts a portion of bearing assembly 200. In particular, surface 231 of inner race flange 230 includes multiple lobes (e.g., lobe 306) to further enhance loading stability. The multiple lobes are located, for example, in an equally spaced apart fashion along surface 231. In this embodiment, each of the lobes extends radially along surface 231 and is configured to interact with surface 241 of the outer cage rim 240. In this embodiment, three such lobes are used, with the lobes being separated from one another by an angle of approximately 120 degrees. In other embodiments, various other numbers and spacing of lobes can be used. Notably, the number of lobes can be varied to affect loading stability, for example.

In operation, oil is circulated in bearing assembly 200 from recess area 234 through the inner race flange 230. The oil flow, as shown by arrows 302, routes through channels 234 to the top and inner side of the inner race flange 230 for contact with the outer cage rim 230 and the remainder of the bearing assembly 200. Each lobe operates as a wedge that affects hydrodynamic loading capacity. The number of channels 234 and the placement of the channels 234 in the inner race flange 230 can be varied to affect oil flow and loading stability, for example.

Lobes can be varied in size in radial, axial and/or circumferential directions to affect loading stability. Variation in size of the lobes affects oil flow and the volume of oil that can be delivered into each location of the bearing assembly 200, thus affecting loading stability of the bearing assembly 200.

Figure 4:
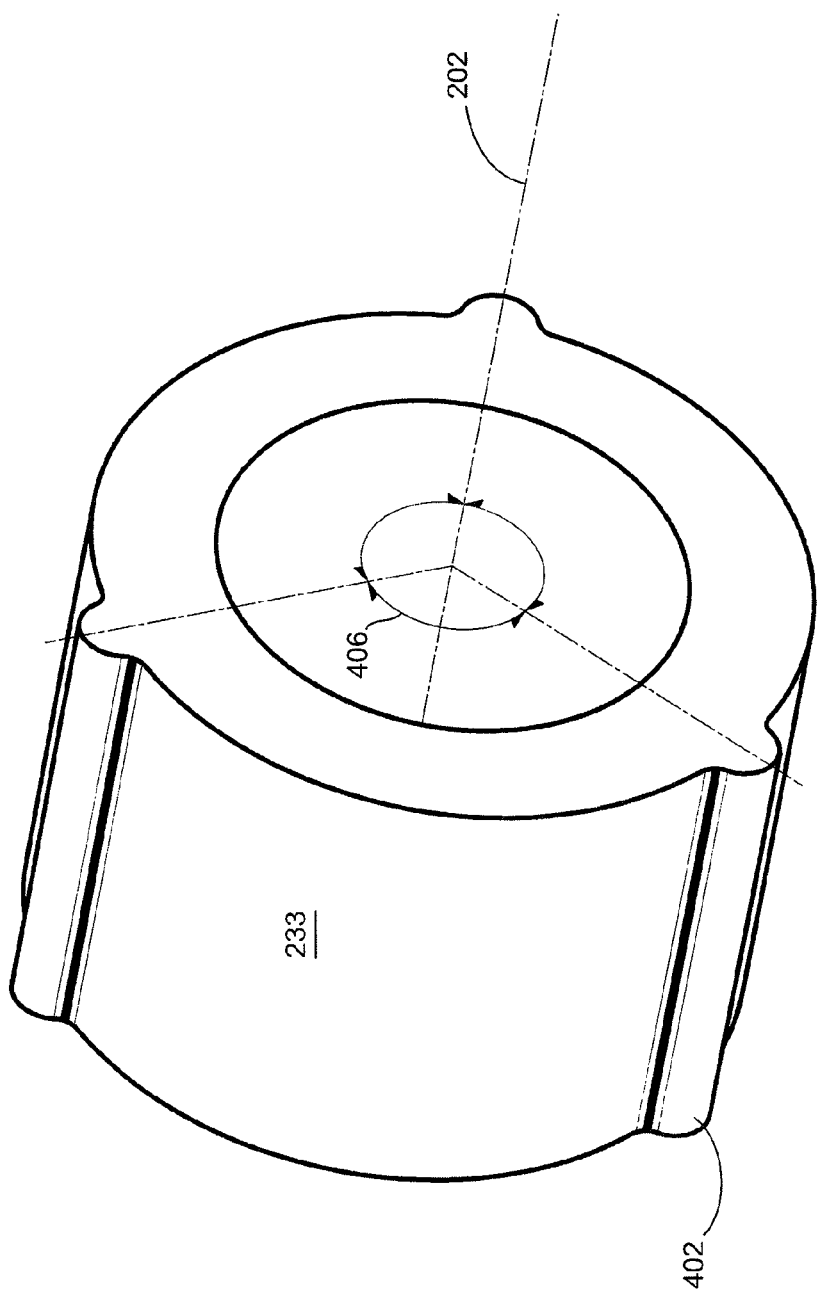
FIG. 4 is a perspective diagram depicting another portion of the hydrodynamic tapered bearing assembly of FIG. 2.

Reference is made to the schematic diagram of FIG. 4, which depicts multiple lobes located on surface 233 for increased hydrodynamic loading stability. As shown in FIG. 4, the lobes (e.g., lobe 402) on surface 233 are configured to interact with surface 243 of the outer cage rim 240. As shown, the lobes are circumferentially separated from one another by an angle 406 of approximately 120 degrees. The lobes 402 can vary in size in radial, axial and/or circumferential directions to affect loading stability.

In summary, the bearing axial load path is re-directed through the outer cage rim to the inner race flange (surface 231) that acts as a hydrodynamic thrust bearing. In the case of thrust reversal during operation, the same concept could be applied to the roller end corresponding to the inner cage rim, resulting in tapered roller bearing with double hydrodynamic thrust bearing faces.

It should be emphasized that the above-described embodiments are merely possible examples of implementations set forth for a clear understanding of the principles of this disclosure. Many variations and modifications may be made to the above-described embodiments without departing substantially from the spirit and principles of the disclosure. By way of example, although the lobes of the bearing assembly have been described herein as being associated with the inner race flange, one or more of the lobes can be located on a bearing cage. All such modifications and variations are intended to be included herein within the scope of this disclosure and protected by the accompanying claims.

The invention claimed is:

1. A bearing for contacting a roller, said bearing comprising:
    a body having an axial forward end and an axial rearward end,
    said axial forward end having a rim portion having a rounded edge for engaging said roller that rotates about an axis, said rim portion being disposed perpendicularly to said axis, wherein said axial forward end and said axial rearward end cause said body to form an L-shape cross-section wherein a portion of said axial forward end is angled relative to said rim portion.

2. The bearing of claim 1, wherein said portion and said axial rearward end are parallel.

3. The bearing of claim 1, wherein said rim is for attaching to said bearing radially inwardly of said axis only.

4. The bearing of claim 1, wherein the rim portion has a radially disposed annular surface operative to direct a load imparted to an outer rim via the roller.

5. The bearing of claim 1, wherein the rim portion has an axially disposed annular surface operative to direct a load imparted to an outer rim via said roller.

6. The bearing cage of claim 1, wherein said rim portion is attached to a hydrodynamic tapered roller bearing cage.

7. A first bearing for supporting a second bearing, said first bearing comprising:
    a body having an axial forward end and an axial rearward end,
    said axial forward end having a rim portion having a rounded edge for engaging said second bearing that rotates about an axis, said rim portion being disposed perpendicularly to said axis, wherein said axial forward end and said axial rearward end cause said body to form an L-shape wherein a portion of said axial forward end is angled relative to said rim portion.

* * * * *

UNITED STATES PATENT AND TRADEMARK OFFICE
CERTIFICATE OF CORRECTION

PATENT NO. : 8,360,657 B2  
APPLICATION NO. : 13/462885  
DATED : January 29, 2013  
INVENTOR(S) : Loc Duong Page 1 of 1

It is certified that error appears in the above-identified patent and that said Letters Patent is hereby corrected as shown below:

ON THE TITLE PAGE:

The Related U.S. Application Data should read as follows:

Item (62) Divisional of application No. 12/036,581, filed on Feb. 25, 2008, now Pat. No. 8,235,599.

Signed and Sealed this
Twenty-eighth Day of May, 2013

Teresa Stanek Rea
*Acting Director of the United States Patent and Trademark Office*